Patented June 17, 1952

2,601,016

UNITED STATES PATENT OFFICE 2,601,016

OIL-RESISTANT ADHESIVE TAPE

James O. Hendricks, White Bear Lake, and Carl A. Dahlquist, St. Paul, Minn., assignors to Minnesota Mining & Manufacturing Company, St. Paul, Minn., a corporation of Delaware No Drawing. Application November 25, 1949, Serial No. 129,508

5 Claims. (Cl. 117—122)

This invention relates to oil-resistant normally tacky and pressure-sensitive adhesives and to sheet material coated therewith. The sheet product in the form of narrow continuous strips is particularly valuable as oil-resistant adhesive tape useful as an insulating and identifying wrapper for copper conductors, coils, etc. which are later to be subjected to contact with transformer oils or other aliphatic hydrocarbons.

Normally tacky and pressure-sensitive adhesives of the rubber-resin type are well-known to industry in the form of adhesive coatings on masking tape and on adhesive tapes for other purposes. Typical formulas contain crude rubber and rosin or various hydrocarbon resins, polymers or copolymers of certain acrylate monomers, blends of isobutylene polymers, etc. These adhesives adhere to most surfaces on mere touch contact therewith, hence the corresponding coated tape products have found a wide variety of applications, both for temporary covering or sealing and as a permanent component.

In developing and evaluating rubber-resin type pressure-sensitive adhesives, "thumb appeal" has come to be an important measure of their relative value. That is, the adhesion of the coated tape to other surfaces has been preliminarily evaluated in terms of its adhesion to the thumb. Both the ultimate adhesion value and also the immediate tackiness and the cohesive strength of the tape adhesive have been more or less quantitatively determined, by experts in the art as well as by the casual user, by means of such "thumb test."

While prior art adhesives of the rubber-resin type having good thumb appeal have proven highly effective on surgical tapes, masking tapes, transparent packaging tapes, etc. they have invariably been found deficient in resistance to transformer oils, liquid asphalts, and the like, due to the solvent action of such materials on the principal components of the adhesive. Hence the manufacturers of electrical equipment such as oil-filled transformers, impregnated cables and coils, and other items constantly in contact with oily materials were forced to employ tied cord or fabric wrappings, water-activated gummed tapes, and other inconvenient and undesirable substitutes in place of normally tacky and pressure-sensitive adhesive tape.

It is therefore a primary object of the present invention to provide a new class of adhesive compositions for adhesive tape, capable of adhering readily to various surfaces under temporary moderate pressure and without activation by heat or solvents, and which furthermore are insoluble in mineral oil. A related and specific object is to provide, in roll form, adhesive tape products suitable for wrapping cables, covering coils, and for other purposes, and which will not be loosened or removed from such cables or coils by prolonged contact with mineral oil. Other objects and advantages will be made apparent as the description of the invention proceeds.

The novel adhesive product of the invention may be characterized as an oil-resistant, normally tacky and pressure-sensitive adhesive composition comprising: (a) a rubbery base material having a constant-stress modulus of about 0.3–1.8 megadynes per sq. cm., and a high-frequency modulus of about 15–40 megadynes per sq. cm., and comprising a rubbery, heptane-insoluble polymer of monomers including about 6–50% of acrylonitrile and correspondingly about 94–50% of at least one other monomer copolymerizable therewith and including at least a major proportion of butadiene; and (b) a thermoplastic tackifier resin which is substantially insoluble in heptane and is compatible with the rubbery base material. The adhesive composition may be dissolved in a suitable volatile solvent, e. g. toluene, methyl ethyl ketone, or a blend of the two, and applied to the desired fabric or other backing, after which the solvent is removed by evaporation. An alternative coating procedure involves calendering of the dry but heat-softened adhesive onto the backing by means of heated metal rolls.

The resulting coated tape product is found to adhere strongly to a large variety of surfaces when pressed thereagainst under mere finger pressure. The tape may later be stripped from the surface without splitting or offsetting of the adhesive layer. It therefore is deservedly characterized as a normally tacky and pressure-sensitive adhesive tape, even though, surprisingly, the tape is almost completely lacking in thumb appeal.

Compositions containing somewhat analogous polymeric and resinous components, together with suitable solvents, have previously been prepared by workers interested in non-adhesive coatings or proofings, permanently bonding cements, etc. Such cements dry to a tack-free surface. However, none of these prior art workers have ever, as nearly as can be ascertained, been successful in providing an adhesive or a coated adhesive tape product having the desirable and novel combination of properties herein described. One possible explanation for this lack of appreciation in the art of the potentialities of this general class of compositions may be in the complete absence of thumb appeal in any of these materials. Frequently, excellent adhesives have been developed by proper proportioning of materials which, even when combined in far from optimum proportions, were observed to have some significant degree of tackiness when tested against the thumb. In the present case, there was available no such hint of possible utility. In any event, no oil-resistant normally tacky and pressure-sensitive adhesives such as those of the present invention have ever previously been produced or suggested.

The peculiar behavior of these novel adhesive compositions in the thumb test is now believed to be due entirely to the normal presence of a thin film of oily material on the surface of the skin. Apparently such film, even though extremely thin, is sufficient to prevent adhesion of the oil-resistant adhesive to the skin. Since the adhesive and the oil are incompatible, the oil is not absorbed or dissolved but instead permanently contaminates the surface of the adhesive and renders it non-adherent. This explanation has been largely verified by the observation that the adhesive tape of this invention adheres easily and firmly to the skin when the latter is first thoroughly rinsed with acetone.

The invention will now be further described in terms of a number of specific examples illustrating various modifications and variations both in components and in proportions. Unless otherwise specified, formulas are given in parts by weight.

*Example 1*

To 100 parts of a rubbery copolymer of 70 parts butadiene and 30 parts acrylonitrile ("Hycar OR-25"), previously softened by brief milling and dissolved in methyl ethyl ketone was added 50 parts of diphenyl cresyl phosphate plasticizer ("Santicizer 140"), and a portion was cast as a thin film on a mercury surface. After removal of solvent, the film was about 20 mils thick. Strips were cut to size and tested for high-frequency modulus and for constant-stress modulus, by methods hereinafter described. These strips of rubbery base were found to have a high-frequency modulus at 2000 cycles and 25° C. of 19 megadynes per sq. cm. and a constant-stress modulus at 10 minutes of 0.44 megadyne per sq. cm. The rubbery polymer alone, similarly tested, was found to have a high-frequency modulus of 37.5 megadynes per sq. cm. and a constant-stress modulus of 2.5 megadynes per sq. cm.

To 100 parts of the polymer and 50 parts of diphenyl cresyl phosphate in solution in methyl ethyl ketone was then added a solution in the same solvent of 40 parts of hard gasoline-insoluble resinous extract of pine wood ("Vinsol" resin) to produce an adhesive solution of 75% solvent content. The solution was coated on closely-woven cloth and the solvent removed by evaporation at room temperature. The coated material was almost totally lacking in normal "thumb appeal" and when so tested appeared to have none of the tackiness or adhesion value of normally tacky and pressure-sensitive rubber-resin type adhesive tape. However, narrow strips or tape segments were found to adhere well when applied by hand to clean glass, metal, cloth and other surfaces. The tape could be wound up on its own backing in roll form and unwound therefrom without delamination or offsetting of the adhesive, although considerable force was required to unwind the tape from the roll.

A strip of the tape was wound around a glass rod of $\frac{7}{16}$ inch diameter in three layers, and the rod was immersed in mineral oil heated to 150° C. Examination after 24 hour immersion showed that the tape was still firmly adhered in place.

The "Vinsol" resin employed in the adhesive is a resin obtained from pine wood by extracting the wood with benzol, evaporating the extract to produce a solid residue, extracting rosin from the residue with a light petroleum hydrocarbon, and recovering the remaining insoluble residue. This final residue is soluble in alcohol but substantially insoluble in ordinary gasoline and in heptane. In the rubber-resin type adhesives of prior art adhesive tapes, "Vinsol" resin acts to mask and diminish the normal tackiness of the composition.

*Example 2*

In this example, rosin substituted phenol was substituted for the "Vinsol" resin of Example 1 as the compatible heptane-insoluble tackifier resin. Rosin substituted phenol is stated by the manufacturer to be a combination of one mol of abietic acid and one mol of phenol. It has a molecular weight of 370. A typical analysis shows a softening point of 120° C., acid number of 97, and hydroxyl content of 3.4 percent.

A total of 140 parts of rosin substituted phenol was milled into 200 parts of the butadiene-acrylonitrile polymer of Example 1, and 50 parts of the resulting blend was dissolved in toluene, together with 6 parts of diphenyl cresyl phosphate, to a total toluene content of 67 percent. The ratio of polymer : plasticizer : tackifier resin is thus seen to be approximately 100 : 20 : 70.

The adhesive solution was coated on cellulose acetate cloth using a spreader bar with a spacing between cloth and bar of 0.015 inch, and the solvent was removed by evaporation at moderately elevated temperature. Strips of the coated fabric one-half inch wide were cut for test. When such strips were uniformly pressed against normal cellophane film (used as a standard test surface) by means of a small-diameter steel roller (½ inch diameter, at a pressure of 1500 grams) and were then removed by stripping at an angle of 90° and a constant rate of 100 cm./min., the force of removal was found to be 15 ounces. Under the same conditions, well-known prior art rubber-resin type pressure-sensitive masking tapes and transparent mending tapes require removal forces of approximately the same order, i. e. between about 10 and about 50 ounces.

Other strips of the coated tape were wrapped around a glass rod and tested as in Example 1. After 24 hours with the oil at 150–160° C., the tape was still firmly bonded.

*Example 3*

A phenolic resin modified with about 50% of rosin and soluble in toluene but insoluble in heptane, and known commercially as "Varcum W-717" resin, was blended with the rubbery polymer and plasticizer of Example 1 in toluene solution and in a ratio of 100 parts polymer, 50 parts plasticizer, and 50 parts resin. The solution was coated on cellophane at a coating weight, after drying, of six grains per 24 sq. in., to produce a transparent adhesive sheet or tape.

One-half inch strips of the coated sheet showed a removal force of 40 ounces when tested on cellophane as in Example 2. Although the strips had no "thumb appeal" as ordinarily tested, they adhered easily and firmly when the thumb was first cleansed with acetone. They also showed high adhesion on touch contact with paper and clean glass surfaces.

In a variation of the formula of Example 3, titanium dioxide pigment was milled into the polymer to the extent of 10 parts per hundred to produce an opaque white adhesive. On cellulose acetate cloth backing, this adhesive showed no failure in the oil-immersion test previously described. Oil resistance as measured in such a test is ordinarily much greater when using an oil-resistant continuous film backing such as cellophane than when using a porous backing such as porous cloth.

*Example 4*

A mill batch of 60 parts of titanium dioxide pigment in 600 parts of the butadiene-acrylonitrile polymer of the previous examples was dissolved in 2500 parts of toluene. There was then added 300 parts of mixed ortho and para toluene ethyl sulfonamide ("Santicizer 8") plasticizer and 300 parts of rosin substituted phenol. The adhesive was uniformly spread on a calendered film of compounded neoprene serving as a tape backing. The adhesive coating after removal of solvent was approximately 0.002 inch thick, the neoprene film backing being about 0.02 inch thick. A varnished cambric liner was placed over the adhesive surface and strips of the tape were wound into roll form. Without the liner, the adhesive adhered to the reverse side of the backing very tenaciously. Under such conditions the tape serves as an excellent insulating and protective wrapping for splices in electrical wires. Such a wrapped splice was found to be undamaged after two weeks immersion in mineral oil at room temperature. At elevated temperatures the particular backing employed was softened but the adhesive was not damaged.

The rubbery base used in the adhesive of Example 4, and consisting of two parts of the butadiene-acrylonitrile polymer and one part of the toluene ethyl sulfonamide plasticizer, has a high frequency modulus at 2000 cycles and 25° C. of 23.5 megadynes per sq. cm. and a constant-stress modulus at 10 minutes of 0.50 megadyne per sq. cm.

*Example 5*

A rubbery polymer was prepared by emulsion polymerization of a composition containing 72 parts of butadiene, 13 parts of styrene, and 15 parts of acrylonitrile. The coagulated and dried polymer was softened by brief milling, formed into a thin film as described under Example 1, and tested for elastic properties. High frequency modulus was 25 megadynes per sq. cm. Constant-stress modulus and 1.2 megadynes per sq. cm. Addition of 30 parts of "Santicizer 8" to 100 parts of the polymer reduced these moduli to 19.5 and 0.59 megadynes per sq. cm. respectively, and such a composition was employed as the rubbery adhesive base. As the compatible tackifier resin there was added 50 parts of rosin substituted phenol. The adhesive was coated from solution in toluene on to cellulose acetate cloth, to a dry coating weight of 32 grains per 24 sq. in. Strips of the coated tape one-half inch wide were pressed against a clean stainless steel panel and stripped from the panel at an angle of 180° and a constant speed of 500 cm. per min.; the force required was 32 ounces. The tape showed satisfactory performance as a coil-winding tape, including adhesion to oil-free surfaces and resistance to hot oil impregnation.

*Example 6*

In this example the proportions of the components of the terpolymer of Example 5 were altered to 72 parts butadiene, 18 parts styrene, and 10 parts acrylonitrile. The unplasticized polymer had a high frequency modulus of 21, and a constant stress modulus of 1.2, megadynes per sq. cm. The addition of 25 parts of "Santicizer 140" to 100 parts of the polymer reduced these modulus values to 20 and 0.48 respectively.

An adhesive composition was prepared by dissolving 655 parts of the above terpolymer (carrying 65 parts of titanium dioxide pigment previously added on the mill), 328 parts of rosin substituted phenol, and 164 parts of "Santicizer 140" in 2468 parts of toluene. The mixture had a viscosity of 23,800 centipoises at room temperature, and could be coated in a uniform smooth layer by means of a spreader bar. Tapes prepared with such adhesive on cellulose acetate cloth backing exhibited an adhesion value (removal force) of 20 ounces per half inch width from its own backing when a roll of the tape was unwound at 100 cm. per min., and 32 ounces when the tape was removed from a cellophane test surface. After nearly three years in roll form, the tape could be unwound without offsetting of the adhesive, and its adhesion to cellophane (measured by the same strip-back test) was 26 ounces. The tape satisfactorily withstood the hot oil immersion test.

*Example 7*

Substitution of an equal amount of pale hard "Nevillac" resin for the rosin substituted phenol of Example 6 produced an equally desirable adhesive and adhesive tape. Adhesion in the roll (at an unwind speed of 100 cm./min) was about 23 ounces and the same value was obtained when the tape was stripped from cellophane. After nearly three years in roll form, the tape could be unwound without offsetting of adhesive, and showed an adhesion to cellophane of 20 ounces. Resistance to hot oil was fully equivalent to that of the adhesive tape of Example 6.

"Nevillac" resin, employed in the above example as the compatible tackifier resin, is a coumarone-indene polymer in which cresols and xylenols are admixed with the naphtha during polymerization so that the resulting product contains phenolic groups in its structure. The resin is insoluble in heptane.

*Example 8*

By the addition of suitable modifiers, in accordance with principles well known in the art of emulsion polymerization of synthetic rubbery materials, the extent of polymerization and hence the molecular weight and the firmness or softness of such polymers may readily be controlled. Thus the addition of further modifier to the emulsion of Example 6 in the formation of a terpolymer of 72 parts of butadiene, 18 parts of styrene, and 10 parts of acrylonitrile results in the production of a softer polymer, requiring no added plasticizer but being directly useful as a rubbery base for the novel adhesive compositions of this invention. One such polymer, with a high frequency modulus of 25 megadynes per sq. cm. and a constant stress modulus of 0.66 megadyne per sq. cm., was employed in the present example. Forty parts of the polymer was softened on the mill, and there was then incorporated, by milling, 32 parts of asbestine (a short-fiber talc product commonly employed as a pigment or filler) followed by 2 parts of titanium dioxide pigment, 0.8 part of stearic acid, and 16 parts of rosin substituted phenol. After cooling, the mill batch was calender-coated on a neoprene film backing as used in Example 4, to a thickness of about 0.02 inch of adhesive, and the coated sheet was placed on a Holland cloth liner, slit into narrow widths, and wound up in roll form. When removed from the liner, the tape served as an excellent splice-covering material, bonding together into a compact mass when wound under tension around the spliced wires.

*Example 9*

A terpolymer of 72 parts butadiene, 13 parts styrene and 15 parts acrylonitrile was produced having a high frequency modulus of 25 megadynes per sq. cm. and a constant-stress modulus of 1.2 megadynes per sq. cm. Addition of 50 parts of rosin substituted phenol to 100 parts of this polymer produced an adhesive which, when coated on cellophane, required a force of 26-32 ounces for stripping from another sheet of cellophane.

*Example 10*

A terpolymer of 60 parts of butadiene, 20 parts styrene and 20 parts acrylonitrile was produced having a high frequency modulus of 49 megadynes per sq. cm. and a constant-stress modulus of 1.8 megadynes per sq. cm. Addition of 25 parts of "Santicizer 8" to 100 parts of the polymer reduced the modulus values to 31 and 0.67 respectively. Addition of 50 parts of the plasticizer further reduced these values to 19 and 0.34 respectively. These blends, as well as an intermediate blend containing 44 parts of the plasticizer in 100 parts of the polymer, served as rubbery base material for useful adhesive compositions. For example, the addition of 30 parts of rosin substituted phenol to the blend of 100 parts polymer and 44 parts plasticizer produced an adhesive mass which when coated in a thin film on cellophane and measured against a cellophane test surface was found to have an adhesion value of 27 ounces per half inch width of coated strip.

*Example 11*

A terpolymer of 60 parts butadiene, 30 parts styrene, and 10 parts acrylonitrile, having a high frequency modulus of 29.5 megadynes per sq. cm. and a constant stress modulus of 1.52 megadynes per sq. cm., was plasticized with 33 parts of "Santicizer 140" and tackified with 50 parts of rosin substituted phenol per 100 parts of polymer. Coated on cellophane, the adhesive showed an adhesion value of 43 ounces per half inch width.

Triphenyl phosphate, ethyl phthalyl ethyl glycollate, and methyl phthalyl ethyl glycollate have been employed in place of the specific plasticizers hereinbefore identified, in providing rubbery base compositions of suitable elastic properties from polymers of butadiene-acrylonitrile type monomers of somewhat high modulus values. As indicated in the examples, desirable results may also be secured by controlling the composition and conditions of polymer formation so that the polymer itself has elastic properties within the range here discovered to be suitable. As previously defined, such range extends from about 15 to about 40 megadynes per sq. cm. in high frequency modulus and from about 0.3 to about 1.8 megadynes per sq. cm. in constant stress modulus. At lower constant stress modulus values, the internal strength of the rubbery base is reduced and the adhesive shows a tendency to string out or split. At higher high frequency modulus values, the adhesive is "harsh," i. e. it does not adhere well under light pressure, and has a tendency to come away in jerks rather than smoothly when the tape is stripped away from a surface. Within the limits given, however, and preferably within the somewhat more restricted limits of 15-30 megadynes for the high frequency modulus and 0.4-1.2 megadynes for the constant stress modulus, adhesives can be prepared which are fully adequate in internal strength for all normal tape uses and which at the same time are aggressively tacky and show smooth unwind or removal properties.

In addition to the specific copolymers and terpolymers previously listed, a number of other polymers containing at least about 6% of acrylonitrile residues have been found to provide the desired combination of properties. Copolymers of 74 parts of butadiene and 26 parts of acrylonitrile, and also of 82 parts of butadiene and 18 parts of acrylonitrile, are specific examples. Higher proportions of acrylonitrile may also be employed, even up to about 50 percent, but these polymers require more active solvents, and the surface of the adhesive is found to be extremely sensitive to the presence of traces of dirt or oil. At least about 10% of acrylonitrile is desirable where best oil resistance is required, although moderately good oil resistance may be obtained with polymers containing as low as 6% of acrylonitrile. The polymers of about 6-50 (preferably 10-40) parts of acrylonitrile and correspondingly 94-50 (preferably 90-60) parts of butadiene are preferred. In several cases isoprene has been found to be equivalent to butadiene. The terpolymers or other polymers in which small proportions of styrene or other copolymerizable monomers are substituted for a minor proportion of the butadiene are also useful, as indicated in the examples. These polymers have the advantage of being somewhat easier to produce, by emulsion methods, without premature coagulation. However they require somewhat increased amounts of plasticizer. Polymers of acrylonitrile and isoamyl acrylate in 15 : 85 and 6.2 : 93.8 ratios have also produced useful oil-resistant adhesives in accordance with this invention. Such an adhesive darkened but did not lose its ability to hold the backing in place when a test wrap was submerged in hot mineral oil for 30 hours.

Where butadiene is specified, equivalent conjugated diolefinic monomers, e. g. methylbutadiene, isoprene, may be used. Likewise, methacrylonitrile may be employed in place of part or all of the acrylonitrile.

Rosin substituted phenol has been found to be the most generally useful tackifier resin in these adhesives. "Vinsol" resin, "Varcum W-717," and "Nevillac" resin have also been shown in the examples to be useful compatible and paraffin-oil-insoluble tackifier resins. Coumarone-indene resins such as "Cumar W" and "Cumar MH-9," and "Belro" resin, obtained from pine wood, have also been found suitable in specific instances. These various resins are representative of the general class of thermoplastic resins compatible with butadiene acrylonitrile rubbery polymers and insoluble in paraffin-type hydrocarbons, here shown to be tackifiers for the specific rubbery base materials hereinbefore identified.

In the specification and claims, the term "high frequency modulus" represents the value calculated from the expression $E_{HF} = v^2 d$ where $E_{HF}$ is the high frequency modulus, $v$ is the velocity of vibrations at 2000 cycles per second through the polymeric material at 25° C., and $d$ is the density of the material in grams per c. c. The method of obtaining the required values will be explained in terms of a specific example.

A film of the polymer, having a measured density of 1.01 grams/c. c. and a thickness of between 0.01 and 0.04 inch, with a variation of not more than 0.002 inch throughout the film, was obtained by casting from solution on a mercury surface, as in Example 1. A ring having an inside diameter of 3.7 centimeters and an outside diameter of 4.85 centimeters was cut from the film and stretched around two pins at a distance apart of 10 centimeters, the two pins being attached respectively to a vibrator and a pickup of the piezoelectric crystal type.

The vibrator is energized by an audio oscillator over the range of 20 to 4000 or more cycles per second. The pickup reproduces the oscillations through an oscilloscope. The consecutive vibration frequencies corresponding to half, full, and multiple standing waves in the rubber strip are thus determined. The sound velocity in the strip is represented by the product of the frequency and wave length values, and may be calculated for 2000 cycles (the upper readily readable range) once the number of standing waves at that frequency has been determined.

In the specific example here considered, a frequency of 2000 cycles was graphically shown to represent 4.55 waves in the 10 cm. length of polymer. Thus the wave length is $$\frac{10}{4.55} = 2.20 \text{ cm.}$$

the sound velocity is $2000 \times 2.20 = 4400$ cm./sec., and the modulus $$E_{HF} = \frac{(4400)^2 \times 1.01}{10^6}$$

$$= 19.6 \text{ megadynes/sq. cm.}$$

The constant stress modulus is calculated from the expression $$E_{CS} = \frac{fl}{e}$$

where $f$ = force applied per unit cross sectional area
$l$ = initial length
$e$ = elongation (difference between original and final length)

Stress is applied by means of a weight descending into a liquid of the same density, the size and shape of the weight being so calculated that the force on the strip of rubbery material remains at a constant desired value per unit cross-section as the length of the strip increases and the cross-section correspondingly decreases. Uniform cross-section over the measured strip is assumed, and is actually closely approximated in practice. A test film was prepared as before and a carefully measured section having a total cross-sectional area in the range of 0.10 to 0.02 sq. cm. was cut out and suitably fastened between supports initially separated a distance of 3.0 centimeters. The stress applied was 1000 grams per sq. cm., being within the desired range of 500 to 2500 grams/sq. cm. Measurement of the length of the stretched film was taken at 10 minutes, and the elongation, $e$, was found to be 6.0 cm. The value of the constant-stress modulus thus becomes $$E_{CS} = \frac{1000 \times 3 \times g}{6 \times 10^6}$$

$$= 0.49 \text{ megadynes/sq. cm.}$$

where $g$, the acceleration of gravity, is 981 cm./sec.$^2$.

Having described various embodiments of our invention for purposes of illustration, but without intent to be limited thereto, what we claim is as follows:

1. Permanently pressure-sensitive oil-resistant adhesive tape or sheet material comprising a thin flexible backing member carrying a surface layer of oil-resistant normally tacky and pressure-sensitive adhesive comprising: (a) a rubbery polymer of monomers including about 10–40 percent of acrylonitrile and correspondingly about 90–60 percent of other copolymerizable monomer of which at least a major proportion is butadiene and not more than a minor proportion is styrene, said polymer having a high frequency modulus of about 20–50 megadynes per sq. cm. and a constant stress modulus of about 0.66–2.5 megadynes per sq. cm. as herein defined; (b) sufficient plasticizer, compatible with said polymer at room temperature, and within the range of about 0–50% based on the weight of said polymer, to provide when combined with said polymer a rubbery base material having a high frequency modulus of about 15–40 megadynes per sq. cm. and a constant stress modulus of about 0.3–1.8 megadynes per sq. cm.; and (c) a minor but substantial proportion, based on the total weight of the adhesive, of a thermoplastic tackifier resin which is substantially insoluble in heptane and is compatible with said rubbery base material.

2. Permanently pressure-sensitive oil-resistant adhesive tape or sheet material comprising a thin flexible backing member carrying a surface layer of oil-resistant normally tacky and pressure-sensitive adhesive comprising (a) 100 parts of a rubbery polymer of monomers including about 10–40 percent of acrylonitrile and correspondingly about 90–60 percent of other copolymerizable monomer of which at least a major proportion is butadiene and not more than a minor proportion is styrene, said polymer having a high frequency modulus of about 20–50 megadynes per sq. cm. and a constant stress modulus of about 0.66–2.5 megadynes per sq. cm. as herein defined; (b) sufficient plasticizer, compatible with said polymer at room temperature, and within the range of about 0–50 parts, to provide when combined with said polymer a rubbery base material having a high frequency modulus of about 15–40 megadynes per sq. cm. and a constant stress modulus of about 0.3–1.8 megadynes per sq. cm.; and (c) about 30–70 parts of a thermoplastic tackifier resin which is substantially insoluble in heptane and is compatible with said rubbery base material.

3. The product of claim 1 in which the proportion of tackifier resin is about 30–70 parts on 100 parts of polymer.

4. The product of claim 1 in which the tackifier resin is rosin substituted phenol.

5. The product of claim 1 in which the thin flexible backing material is transparent.

JAMES O. HENDRICKS.
CARL A. DAHLQUIST.

REFERENCES CITED

The following references are of record in the file of this patent:

UNITED STATES PATENTS

| Number | Name | Date |
|---|---|---|
| 2,384,547 | Fryling | Sept. 11, 1945 |
| 2,456,454 | Signer | Dec. 14, 1948 |
| 2,458,166 | Homeyer | Jan. 4, 1949 |
| 2,462,029 | Perry | Feb. 15, 1949 |
| 2,484,416 | Martin | Oct. 11, 1949 |
| 2,491,477 | Chimel | Dec. 20, 1949 |
| 2,498,338 | Martin | Feb. 21, 1950 |